United States Patent [19]

Bacher et al.

[11] 3,837,869

[45] *Sept. 24, 1974

[54] CELSIAN CONTAINING DIELECTRIC CROSSOVER COMPOSITIONS

[75] Inventors: Rudolph J. Bacher, New Castle; Takashi Nakayama, Wilmington, both of Del.

[73] Assignee: E. I. du Pont de Nemours and Company, Wilmington, Del.

[ * ] Notice: The portion of the term of this patent subsequent to Apr. 18, 1989, has been disclaimed.

[22] Filed: July 20, 1972

[21] Appl. No.: 273,355

[52] U.S. Cl. .................................. 106/53, 252/63.5

[51] Int. Cl. ......... C03c 3/10, C03c 3/04, C03c 3/30

[58] Field of Search ........................ 106/53; 252/63.5

[56] References Cited

UNITED STATES PATENTS

| | | | |
|---|---|---|---|
| 3,656,984 | 4/1972 | Hoffman | 106/53 |
| 3,785,837 | 1/1974 | Amin | 106/39.8 |

*Primary Examiner*—Winston A. Douglas
*Assistant Examiner*—Mark Bell

[57] ABSTRACT

Improved crossover dielectric compositions which are finely divided powders of glass and preformed celsian; the compositions are capable of producing printed capacitors of reduced dielectric constant.

8 Claims, No Drawings

CELSIAN CONTAINING DIELECTRIC CROSSOVER COMPOSITIONS

BACKGROUND OF THE INVENTION

It is well established in the art that the electrical properties of a ceramic body depend on the chemical composition and the grain structure of the body. There is considerable literature in the art dealing with the addition of minor amounts of various chemical ingredients to the ceramic particles from which a ceramic dielectric body is prepared (by sintering) for the purpose of improving electrical properties of the body, such as dielectric constants, temperature dependence of the dielectric constant, leakage control, power factor, and stability of electrical properties with time at various temperatures and electric load conditions.

A crossover dielectric composition is essentially a low dielectric constant insulator capable of separating two conductor patterns through subsequent firing of the assembly. In the past, high melting, viscous glasses have been used as the dielectric so that the firing of the top conductor line can be carried out at a temperature below that at which softening of the dielectric occurs. Melting or softening of the crossover dielectric may be accompanied by either shorting of the two conductor patterns against each other with subsequent failure of the electrical circuit or reductions in solderability of the top conductor. The major requirement for a crossover dielectric is control of resoftening or thermoplasticity in the top conductor firing step or during subsequent firing or other components of the circuit. Other property requirements are: (a) low dielectric constant to prevent A.C. capacitance coupling between insulated circuits, (b) low electric loss (high Q value) to avoid dielectric heating, (c) low "pinholing" tendency and a low tendency to evolve gasses in firing, (d) proper glass-ceramic precursor softening temperature so that the initial firing is adaptable to the screen printing process, (e) a high resistance to thermal shock crazing, and (f) low sensitivity to water vapor and subsequent spurious electrical losses.

There is a continuing need for better crossover dielectric compositions.

The dielectric compositions of Hoffman U.S. Pat. No. 3,656,984 are partially crystallizable glasses which upon being fired produce dielectric crossover layers having less than 50 percent crystals. The major crystalline phase is celsian or hexacelsian, $BaAl_2Si_2O_8$, a feldspar of cubic symmetry. Dielectric constants of 14 and above (see column 7, line 32) have often resulted upon firing these prior art compositions.

SUMMARY OF THE INVENTION

The present invention relates to finely divided glass compositions for producing celsian containing dielectric layers between conductor patterns printed on a dielectric substrate. Such dielectric layers appear between the conductor patterns at the point of their crossover. This invention specifically is improved compositions for producing crossovers of reduced dielectric constant, which hence exhibit reduced signal coupling between the respective conductor layers. The compositions of the present invention, in addition to glass, contain an amount of preformed celsian crystals, $BaO.Al_2O_3.2SiO_2$, effective to lower the dielectric constant of fired crossover dielectrics thereof.

Also of this invention are the subject compositions dispersed in an inert liquid vehicle. In the improved compositions of the present invention, the total amount of preformed celsian in the finely divided compositions of the present invention is 10–75 percent of the total weight of the composition. Preferably, the glass comprises a lead borosilicate glass. Optimum compositions are those wherein up to 50 percent of the glass is a partially crystallizable glass having the operable and preferred proportions set forth in Table I.

Optimum compositions also are those wherein at least 50 percent of the total weight of glass and preformed celsian in the finely divided compositions of the present invention in celsian and said partially crystallizable glass.

TABLE I

| | (Weight Percent) Operable Proportions | Preferred Proportions |
|---|---|---|
| $SiO_2$ | 20–38 | 22–32 |
| PbO | 21–45 | 22–42 |
| $Al_2O_3$ | 1–25 | 9–13 |
| $TiO_2$ | 2–20 | 3–15 |
| BaO | 2–15 | 4–12 |
| ZnO | 0–25 | 0–20 |
| $PbF_2$ | 0–15 | 0–10 |
| SrO | 0–5 | 0–4 |
| $ZrO_2$ | 0–5 | 0–4 |
| $Ta_2O_5$ | 0–5 | 0–4 |
| $WO_3$ | 0–5 | 0–4 |
| CdO | 0–5 | 0–4 |
| $SnO_2$ | 0–5 | 0–4 |
| $Sb_2O_3$ | 0–5 | 0–4 |

DETAILED DESCRIPTION

The present invention provides finely divided dielectric compositions capable of producing crossover dielectrics of reduced dielectric constant. The invention employs a mixture of preformed celsian and glass, in the unfired composition. The amount of preformed celsian in the composition will depend upon the balance of properties desired in the fired crossover. At least 10 percent of the composition should be celsian to derive a significant benefit from the present invention. Usually, at least 20 percent celsian will be present in these improved compositions. No more than 75 percent celsian is present in the unfired compositions, since more than 75 percent will result in porous dielectrics of unacceptably high dissipation factor. Generally, less than 60 percent celsian will be present in the unfired compositions.

The glass preferably is, or comprises, lead borosilicate glass. A typical composition is 5–15 percent $Al_2O_3$; 15–25 percent PbO; 40–60 percent $SiO_2$; 2–10 percent $B_2O_3$; total ZnO and CaO, 5–10 percent; total $Na_2O$, $K_2O$ and $Li_2O$, 1–5 percent; and total MgO and SrO, 0–4 percent. Optimum glasses are those wherein part of the glass, up to 50 percent of the total weight of glass in the glass/celsian composition, is the partially crystallizable glass of Hoffman U.S. Pat. No. 3,656,984 (see Table I herein).

It is often desirable that at least 50 percent of the total weight of the compositions of this invention (glass and celsian) be celsian plus the Hoffman glass of Table I.

The celsian may be produced in any convenient manner. The celsian used in the Examples was produced as follows (and was identified by X-ray techniques): 197.4 parts $BaCO_3$, 101.9 parts $Al_2O_3$ and 120 parts $SiO_2$ were fired to 1100°C. and held there for 2 hours, then cooled and ball milled to a fine powder.

The celsian is in finely divided form, i.e., average particle size in the range 1–15 microns, with no particles greater than about 40 microns.

The glasses used in the compositions of the present invention are produced in the conventional manner. Thus, a physical mixture of the metal oxides forms stable glasses when quenched from the molten state (in water). The glasses are finely ground in a ball mill and have an average particle size not exceeding 50 microns in diameter; those having average particle sizes of 1–15 microns are distinctly preferred. The preparation of the partially crystallizable glasses preferably employed as part of the glass phase in the compositions of the present invention is described in detail in U.S. Pat. No. 3,656,984.

The preformed celsian and glass frit are normally ground up individually and then dispersed in an inert liquid vehicle to form a paste. The paste is then applied (e.g., by screen stenciling) onto the desired metallized, prefired substrate, in the desired crossover configuration. Usually the top conductor metallization is printed over the unfired crossover, and the top conductor and crossover are cofired; separate firing of the crossover, prior to printing of the top conductor, may be employed if desired.

Firing of the crossover layer is generally accomplished at a temperature in the range 800°–1000°C., typically for about 10 minutes. As one skilled in the art will appreciate, firing conditions are selected to produce a dense crossover. The use of preformed celsian in the compositions of the present invention permits use of higher firing temperatures without causing sinking and cracking of the top electrode, while maintaining a low dielectric constant.

In preparing crossover dielectric compositions, any inert liquid may be utilized as the vehicle. Water or any one of various organic liquids, with or without thickening and/or stabilizing agents and/or other common additives, may be used. Examples of organic liquid that can be used are the aliphatic alcohols; esters of such alcohols, for example, the acetate and propionates; the terpenes such as pine oil, alpha- and beta-terpineol and the like; solutions of resins such as the polymethacrylates of lower alcohols, or solutions of ethyl cellulose, in solvents such as pine oil and the monobutyl ether of ethylene glycol monoacetate. The vehicle may contain or be composed of volatile liquids to promote fast-setting after application; or it may contain waxes, thermoplastic resins or the like materials which are thermofluids so that the vehicle-containing composition may be applied at an elevated temperature to a relatively cold ceramic body upon which the composition sets immediately.

The ratio of inert vehicle to solids (glass and celsian in the dielectric compositions of this invention may vary considerably depending upon the manner in which the paint or paste is to be applied and the kind of vehicle used. Generally, from 1–20 parts by weight of solids per part by weight of vehicle will be used to produce a paint or paste of the desired consistency. Preferably, 4–10 parts of solids per part of vehicle will be used.

A wide variety of metals can be used in the electrode layers of capacitors prepared using the crossover dielectrics of this invention. While not intending to limit the scope of this invention, the preferred metals are noble metals and particularly gold, silver, platinum, palladium, rhodium, and iridium, and alloys, oxides and mixtures thereof.

The invention is illustrated by the following Examples. In the Examples and elsewhere in the specification, all parts, ratios and percentages of materials or components are by weight. All glasses and preformed celsian used in the Examples had an average particle size in the range 1–15 microns with substantially no particles greater than about 40 microns.

The fine glass powders identified in Table II were dispersed with the amounts of preformed celsian set forth in Table III, in an inert vehicle consisting of 8 percent ethyl cellulose and 92 percent beta-terpineol. The solids/vehicle weight ratio in each Example was about 3/1. The resulting paste was ready for printing.

EXAMPLES 1–3

The pastes of Examples 1–3 were printed on a prefired alumina substrate to evaluate the porosity of the fired dielectric. The paste was printed twice through a 200-mesh screen; the fired dielectric layer was determined to be dense (non-porous) by the following ink test. The fired sample was immersed in a solution of blue water ink, wiped off with a damp cloth, and examined for dye penetration. Lack of dye penetration indicated a dense dielectric.

EXAMPLES 4–10

A 96 percent alumina ceramic substrate was provided with a screen printed conductive plane of a conductor composition. In Examples 4 and 5, the conductor composition was a dispersion containing finely divided solids (1 part Pd and 2 parts Ag, with minor amounts of bismuth oxide and glass frit). In Examples 6–10, a Pd/Au conductor composition was used, containing finely divided solids (55 parts Au, 15 parts Pd, 12 parts $Bi_2O_3$ and 3 parts glass frit) in 15 parts vehicle. This bottom conductive plane was fired at 950°C. (Examples 4 and 5) or 1,000°C. (Examples 6–10) for two minutes. This temperature is not critical but is generally made as high as the metal phase in the conductor will tolerate in order to provide good adhesion.

These preprinted and prefired substrates were then covered with a crossover dielectric print utilizing the previously prepared dispersions of the compositions of Table III, in the desired configuration consisting of a complete cover, with edges included except for a land area at one corner for connection to the ground plane. The prints were made twice through a 200-mesh screen stencil in order to give a fairly thick fired layer of crossover (about 2 mils after firing).

A top conductor layer (same composition as the bottom conductor in each Example) was printed over the unfired crossover layer to conform to the configuration of the glass ceramic dielectric layer. the top conductor and crossover were cofired in a belt furnace at the temperature set forth in Table III, for 10 minutes at peak. In every situation the top conductor lines were printed and fired without significant flow of the crossover or sinking of the top electrode; therefore, porosity was good and there was no short circuiting. K was determined and is set forth in Table III.

TABLE II

Glasses Used in Crossover Compositions of Examples

| Glass Component | Glass Type (wt. %) | |
|---|---|---|
| | Lead Borosilicate | Partially Crystallizable |
| BaO | — | 8.0 |
| $Al_2O_3$ | 9.1 | 11.0 |
| ZnO | — | 10.0 |
| PbO | 17.2 | 32.0 |
| $SiO_2$ | 56.5 | 27.0 |
| $TiO_2$ | — | 12.0 |
| $B_2O_3$ | 4.5 | — |
| $Na_2O$ | 2.4 | — |
| $K_2O$ | 1.7 | — |
| CaO | 8.6 | — |

TABLE III

Crossover Compositions

| Component | Example No. | | | | | | | | | |
|---|---|---|---|---|---|---|---|---|---|---|
| | 1 | 2 | 3 | 4 | 5 | 6 | 7 | 8 | 9 | 10 |
| Celsian | 75 | 50 | 25 | 30 | 50 | 32 | 25 | 20 | 10 | 40 |
| Glass | 25 | 50 | 75 | 70 | 50 | 68 | 75 | 80 | 90 | 60 |
| PbBSi Glass (%) | 0 | 0 | 0 | 70 | 50 | 48 | 50 | 50 | 50 | 60 |
| Partially crystallizable glass (%) | 25 | 50 | 75 | — | — | 20 | 25 | 30 | 40 | — |
| Firing Temperature (°C.) | 800 | 800 | 800 | 950 | 950 | 1000 | 1000 | 1000 | 1000 | 1000 |
| K | N.D.* | N.D. | N.D. | 8 | 8.5 | 8.3 | 10.9 | 8.3 | 10.2 | 7.9 |

*N.D. means K was not determined.

It is to be stressed that the compositions of the present invention not only may produce crossovers of low dielectric constant, but the compositions are much less sensitive to firing conditions (time and temperature of firing) than are compositions which involve in situ crystal formation. Thus, the phenomenon of electrodes sinking into the dielectric due to harsh firing conditions (and consequent circuit interruption) is less likely with the pre-formed celsian compositions of the present invention.

We claim:

1. In a finely divided lead borosilicate glass composition for producing celsian-containing crossover dielectric layers between conductor patterns printed on a dielectric substrate, said dielectric layers being at at least one point of crossover of said conductor patterns, improved compositions for producing crossovers of reduced dielectric constant and hence exhibiting reduced signal coupling between the conductors, said compositions comprising, in addition to said glass, an amount of preformed celsian crystals, $BaO.Al_2O_3.2SiO_2$, effective to lower the dielectric constant of fired crossover dielectrics thereof to not higher than 10.9.

2. Improved compositions according to claim 1 dispersed in an inert liquid vehicle.

3. Improved compositions according to claim 1 comprising an amount of celsian in the range 10–75 percent of the total weight of said composition.

4. Improved compositions of glass and celsian according to claim 1 wherein up to 50 percent of the glass is a partially crystallizable glass of, by weight, 20–38% $SiO_2$
21–45% PbO
1–25% $Al_2O_3$
2–20% $TiO_2$
2–15% BaO
0–25% ZnO
0–15% $PbF_2$
0–5% SrO
0–5% $ZrO_2$
0-5% $Ta_2O_5$
0–5% $WO_3$
0–5% CdO
0–5% $SnO_2$
0–5% $Sb_2O_3$ 5. Improved compositions according to claim 4 wherein up to 50 percent of the weight of the glass is a partially crystallizable glass of, by weight, 22–32% $SiO_2$
22–42% PbO
9–13% $Al_2O_3$
3–15% $TiO_2$
4–12% BaO
0–20% ZnO
0–10% $PbF_2$
0–4% SrO
0–4% ZrO
0–4% $Ta_2O_5$
0–4% $WO_3$
0–4% CdO
0–4% $SnO_2$
0–4% $Sb_2O_3$ 6. Improved compositions according to claim 4 wherein at least 50 percent of the total weight of glass and celsian is celsian plus a partially crystallizable glass of 20–38% $SiO_2$
21–45% PbO
1–25% $Al_2O_3$
2–20% $TiO_2$
2–15% BaO
0–25% ZnO
0–15% $PbF_2$
0–5% SrO
0–5% $ZrO_2$
0–5% $Ta_2O_5$
0–5% $WO_3$
0–5% CdO
0–5% $SnO_2$
0–5% $Sb_2O_3$ 7. Compositions according to claim 4 dispersed in an inert liquid vehicle.

8. Compositions according to claim 5 dispersed in an inert liquid vehicle.

* * * * *